United States Patent
Fujibayashi

(10) Patent No.: US 8,942,621 B2
(45) Date of Patent: Jan. 27, 2015

(54) PHASE ADJUSTMENT CIRCUIT AND PHASE ADJUSTMENT METHOD

(75) Inventor: Takeji Fujibayashi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 310 days.

(21) Appl. No.: 13/518,031

(22) PCT Filed: Mar. 28, 2011

(86) PCT No.: PCT/JP2011/001827
§ 371 (c)(1),
(2), (4) Date: Jun. 21, 2012

(87) PCT Pub. No.: WO2011/121979
PCT Pub. Date: Oct. 6, 2011

(65) Prior Publication Data
US 2012/0256673 A1    Oct. 11, 2012

(30) Foreign Application Priority Data

Mar. 29, 2010    (JP) .................................. 2010-075414

(51) Int. Cl.
H04B 7/165    (2006.01)
H04L 27/36    (2006.01)
(52) U.S. Cl.
CPC .................................. H04L 27/366 (2013.01)
USPC ............................................. 455/23; 455/20
(58) Field of Classification Search
CPC ......... H04L 1/00; H04L 27/366; H04L 29/00; H04L 7/00
USPC .................. 375/235, 308, 330; 455/23, 232.1
See application file for complete search history.

(56) References Cited

U.S. PATENT DOCUMENTS

| | | | |
|---|---|---|---|
| 3,660,764 A * | 5/1972 | Goell | ............................ 375/330 |
| 5,355,101 A | 10/1994 | Ichihara et al. | |
| 5,406,629 A * | 4/1995 | Harrison et al. | ................ 380/34 |
| 6,054,883 A | 4/2000 | Ishihara | |

(Continued)

FOREIGN PATENT DOCUMENTS

| CN | 101316112 A | 12/2008 |
|---|---|---|
| JP | 04-275746 | 10/1992 |

(Continued)

OTHER PUBLICATIONS

International Preliminary Report on Patentability for corresponding application PCT/JP2011/001827.

*Primary Examiner* — Wesley Kim
*Assistant Examiner* — Raj Chakraborty
(74) *Attorney, Agent, or Firm* — Morgan, Lewis & Bockius LLP

(57) ABSTRACT

There is provided a circuit for adjusting phases of IQ local signals. As to a local signal A and a local signal B generated by a local signal generating unit for the purpose of generating IQ quadrature local signals, the local signal B in which the gain is adjusted is added to the output of the local signal A to obtain the local signal A2, and the local signal A in which the gain is adjusted is subtracted from the output of the local signal B to obtain the local signal B2. Even if the phase relationship between the local signal A and the local signal B deviates from 90 degrees, the phase difference between the local signal A2 and the local signal B2 can be adjusted with ease by changing the adjustment amounts of variable amplifiers AMP1 and AMP2.

13 Claims, 12 Drawing Sheets

(56) References Cited

U.S. PATENT DOCUMENTS

| | | | |
|---|---|---|---|
| 6,377,620 B1 | 4/2002 | Ozluturk et al. | |
| 7,020,216 B1 * | 3/2006 | Lipp | 375/308 |
| 2002/0042255 A1 * | 4/2002 | Prentice | 455/232.1 |
| 2003/0141932 A1 | 7/2003 | Toyota et al. | |
| 2004/0137856 A1 | 7/2004 | Kanazawa et al. | |
| 2007/0092021 A1 | 4/2007 | Otaka et al. | |
| 2008/0025435 A1 | 1/2008 | Yamaguchi et al. | |
| 2009/0141788 A1 * | 6/2009 | Ozluturk et al. | 375/235 |
| 2010/0219896 A1 | 9/2010 | Sanduleanu et al. | |

FOREIGN PATENT DOCUMENTS

| | | | |
|---|---|---|---|
| JP | 5-130156 | | 5/1993 |
| JP | 07-303028 | | 11/1995 |
| JP | 11-017757 | | 1/1999 |
| JP | 11-098212 | | 4/1999 |
| JP | 11-98212 | * | 4/1999 |
| JP | 11-284490 | * | 10/1999 |
| JP | 2000-151731 | | 5/2000 |
| JP | 2002-535924 | | 10/2002 |
| JP | 2003-218649 | * | 7/2003 |
| JP | 2004-222259 | | 8/2004 |
| JP | 2005-184412 | | 7/2005 |
| JP | 2005-252861 | | 9/2005 |
| JP | 2005-252931 | | 9/2005 |
| JP | 2005-252861 | * | 10/2005 |
| JP | 2005-252931 | * | 10/2005 |
| JP | 2007-104007 | | 4/2007 |
| JP | 2008-022243 | | 1/2008 |
| JP | 2008-205810 | | 9/2008 |
| JP | 2008-544619 | | 12/2008 |

* cited by examiner

PHASE ADJUSTMENT CIRCUIT AND PHASE ADJUSTMENT METHOD

The present application is the national stage application of PCT/JP2011/001827, filed Mar. 28, 2011, which claims priority to Japanese Patent Application No. 2010-075414, filed Mar. 29, 2010, the contents of which are incorporated herein by reference.

TECHNICAL FIELD

The present invention relates to a phase adjustment circuit and a phase adjustment method, and in particular, relates to a phase adjustment circuit and a phase adjustment method for generating an IQ quadrature local signal to be used for a reception circuit for quadrature demodulation or a transmission circuit for quadrature modulation.

BACKGROUND ART

In recent years, as represented by mobile telephones or digital broadcasting, a digital modulation method by modulating digital signals for transmission and reception is widely used as a radio communication method.
The digital modulation mainly includes Phase Shift Keying (PSK) modulation, Quadrature PSK (QPSK) modulation, Quadrature Amplitude Modulation (QAM), and Orthogonal Frequency Division Multiplexing (OFDM).
Each of the above modulation methods is a communication method by use of a signal, in which an I signal (In-phase signal, In-phase component) and a Q signal (Quadrature signal, Quadrature component) are quadrature multiplexed.

In IQ modulation or IQ demodulation by use of these I and Q signals, the following method is simple and effective as one of the methods. That is, the simple and effective method is to directly modulate a baseband signal represented as IQ with a mixer circuit or directly demodulating a high-frequency signal that is IQ quadrature modulated, by use of an IQ quadrature local signal having two signals of carrier frequencies different from each other by 90 degrees. However, in this direct modulation or direct demodulation, if the phase difference between the I local signal and Q local signal deviates from 90 degrees, which is an ideal phase difference, the IQ quadrature property is damaged and the communication quality is degraded.

For example, if the phase difference between the IQ quadrature local signals deviates from exact 90 degrees in a transmitter or receiver for IQ quadrature modulation, IQ constellation of the modulation signal and demodulation signal would distort and lead to the deterioration of Error Vector Magnitude (EVM). Thus, it is important to suppress the phase error of IQ quadrature local signals to be small for achieving a superior communication quality. However, the phase error of the IQ quadrature local signals is caused by a variety of factors, such as incompleteness of a 90-degree phase shift circuit for generating the I and Q local signals, unbalance on the I-side or Q-side transmission paths of the I and Q local signals, or the like. For this reason, in order to achieve an extremely small phase error, the phase correction of the IQ local signals is needed.

The measure for adjusting the phase error of the IQ local signals is described in Patent Document 1, for example. In Patent Document 1, the phase difference of the IQ local signals is adjusted to suppress the phase error by use of a circuit as shown in FIG. 18. In this circuit, a local signal is input into a single input terminal, and the local signal in which its phase has been adjusted is obtained from a differential output port. Then, the capacitance value and the resistance value are respectively adjusted with capacitances C1 and C2 or resistances R1 and R2 being as variable elements, so that the phase of the signal appearing at the differential output port is changed according the value.

PRIOR ART DOCUMENTS

Patent Documents

Patent Document 1: JP 2008-205810 A

SUMMARY OF THE INVENTION

Problem to be Solved

In the actual circuit for realizing the transmitter or receiver for the IQ quadrature modulation, a variety of factors may deviate the phase difference between the IQ quadrature local signals from 90 degrees. For example, a mismatch in the resistance component or capacitance component occurring in the propagation path from the IQ quadrature local signal generating circuit to the mixer circuit causes a difference in the propagation delay of the IQ local signals. Besides, a mismatch between I and Q included in the IQ quadrature local signal generating circuit itself causes a difference in the waveform between the IQ local signals. As a result, the switching timings are made different between I and Q local signals in the mixer circuit, and this causes a phase error in some cases. Therefore, in order to improve the communication quality, an IQ phase adjustment circuit is needed for correcting the phase difference between the IQ quadrature local signals to be 90 degrees, after the transmitter or the receiver is manufactured.

In this situation, in the circuit described in Patent Document 1, the phase is adjusted by utilizing the frequency characteristics of phase fluctuations made by a combination of resistance and capacitance. For this reason, the resistance value and the capacitance value need to be adjustable significantly to adjust the phase of the local signal having a wide frequency range from a low frequency to a high frequency. On the other hand, an extremely fine adjustment is necessary for ensuring the phase adjustment accuracy. Accordingly, a wide resistance adjustment range and a wide capacitance adjustment range are demanded and a fine adjustment thereof is also demanded. Therefore, while maintaining high accuracy, the application to the local signal having a wide frequency range increases the scale in the element value switching.
Hence, its realization is not easy.

In addition, in some cases, the transmitter or the receiver is realized in a semiconductor integrated circuit. In order to switch the resistance value and the capacitance value with high accuracy in the circuit described in Patent Document 1 used in a semiconductor integrated circuit, a very large-sized element is generally necessary. Therefore, in order to realize the IQ phase adjustment circuit including the circuit described in Patent Document 1 in the semiconductor integrated circuit, there is a problem that the circuit area size becomes very large.

The present invention has been made in view of the above circumstances, and has an object of providing a phase adjustment circuit and a phase adjustment method, so that the highly accurate phase adjustment can be easily achieved for IQ local signals each having a wide frequency range and can be achieved in a very small-sized area even in a semiconductor integrated circuit.

Solution to the Problem

In order to attain the above object, according to an aspect of the present invention, there is provided a phase adjustment circuit comprising: a first amplifier for receiving one of a first I local signal and a first Q local signal having a frequency identical to that of the first I local signal and a phase different from that of the first I local signal; and a first adding and subtracting unit for adding or subtracting the other of the first I local signal and the first Q local signal to or from an output signal from the first amplifier, outputting a second Q local signal when said one of the first I local signal and the first Q local signal is the first I local signal, and outputting a second I local signal when said one of the first I local signal and the first Q local signal is the first Q local signal. With such a configuration, a precise phase adjustment of the IQ local signals for use in the quadrature modulation/demodulation circuit is achievable.

The above phase adjustment circuit may further comprise: a second amplifier for receiving the other of the first I local signal and the first Q local signal; and a first adding and subtracting unit for adding or subtracting said one of the first I local signal and the first Q local signal to or from an output signal from the second amplifier, outputting a second I local signal when said one of the first I local signal and the first Q local signal is the first I local signal, and outputting a second Q local signal when said one of the first I local signal and the first Q local signal is the first Q local signal. With such a configuration, a precise phase adjustment of the IQ local signals for use in the quadrature modulation/demodulation circuit is achievable.

Preferably, a gain of the first amplifier and that of the second amplifier are variable. Since the gain is variable, the phases of the IQ local signals can be adjusted with accuracy.

In addition, a gain of the first amplifier and that of the second amplifier may be fixed.

Preferably, the gain of the first amplifier and that of the second amplifier are respectively adjusted by changing a bias current. A precise phase adjustment of the IQ local signal is enabled by changing the bias current for a gain adjustment.

Load resistances may be connected to the first amplifier and the second amplifier, respectively, and the bias current is respectively supplied to the load resistances. The bias current is changed for varying the mutual conductance value, thereby to adjust a gain determined by a product of the mutual conductance value and the load resistance, so that a precise phase adjustment of the IQ local signals is enabled.

In another aspect of the phase adjustment circuit, the gain of one of the first amplifier and the second amplifier may be set to 0 in accordance with a positive or negative value of a phase error that is an error deviating from 90 degrees of a phase difference between the first I local signal and the first Q local signal. With such a configuration, the phase adjustment circuit is achievable with a simple configuration of the operation of only one of the amplifiers.

One of the first adding and subtracting unit and the second adding and subtracting unit may make an addition, and the other of them makes a subtraction. With such a configuration, a precise phase adjustment of the IQ local signal for use in the quadrature modulation/demodulation circuit is achievable with a simpler configuration.

Said one of the first I local signal and the first Q local signal may be input through a third amplifier into the second adding and subtracting unit, and the other of the first I local signal and the first Q local signal may be input through a fourth amplifier into the first adding and subtracting unit. With such a configuration, a precise phase adjustment of the IQ local signal for use in the quadrature modulation/demodulation circuit can be realized.

The first adding and subtracting unit may be realized by wire-connecting an output from the first amplifier and an output from the fourth amplifier, and the second adding and subtracting unit is realized by wire-connecting an output from the second amplifier and an output from the third amplifier. With such a configuration, the phase adjustment circuit is achievable with a simple configuration, because the adding and subtracting unit can be realized by wire-connecting the outputs.

Preferably, the above phase adjustment circuit may further comprise a local signal generating unit for generating the first I local signal and the first Q local signal, wherein the local signal generating unit may have a frequency dividing unit for receiving a fifth local signal to divide the fifth local signal at a predefined frequency division ratio and generate the first Q local signal.

The IQ phase adjustment circuit is achievable with a simpler configuration by constituting the IQ phase adjustment circuit with a frequency divider.

The above phase adjustment circuit may further comprise a local signal generating unit for generating the first I local signal and the first Q local signal, wherein the local signal generating unit may have a phase dividing unit for receiving a fifth local signal to shift a phase of the fifth local signal and generate the first Q local signal. With such a configuration, a phase adjustment can be accomplished so that the phase error is zero.

According to another aspect of the present invention, there is provided a phase modulation method comprising: a first step for receiving one of a first I local signal and a first Q local signal having a frequency identical to that of the first I local signal and a phase different from that of the first I local signal; and a second step for adding or subtracting the other of the first I local signal and the first Q local signal to or from an output signal from the first amplifier, outputting a second Q local signal when said one of the first I local signal and the first Q local signal is the first I local signal, and outputting a second I local signal when said one of the first I local signal and the first Q local signal is the first Q local signal.

With such a configuration, a precise phase adjustment of the IQ local signal for use in the quadrature modulation/demodulation circuit is achievable.

Advantageous Effects of the Invention

According to the present invention, a precise phase adjustment of IQ local signals for use in an quadrature modulation/demodulation circuit is achievable in a wide local frequency range. In addition, when realizing an IQ phase adjustment circuit in a semiconductor integrated circuit, it is possible to realize the IQ phase adjustment circuit in a very small-sized area.

DESCRIPTION OF EMBODIMENTS

Figure 1:
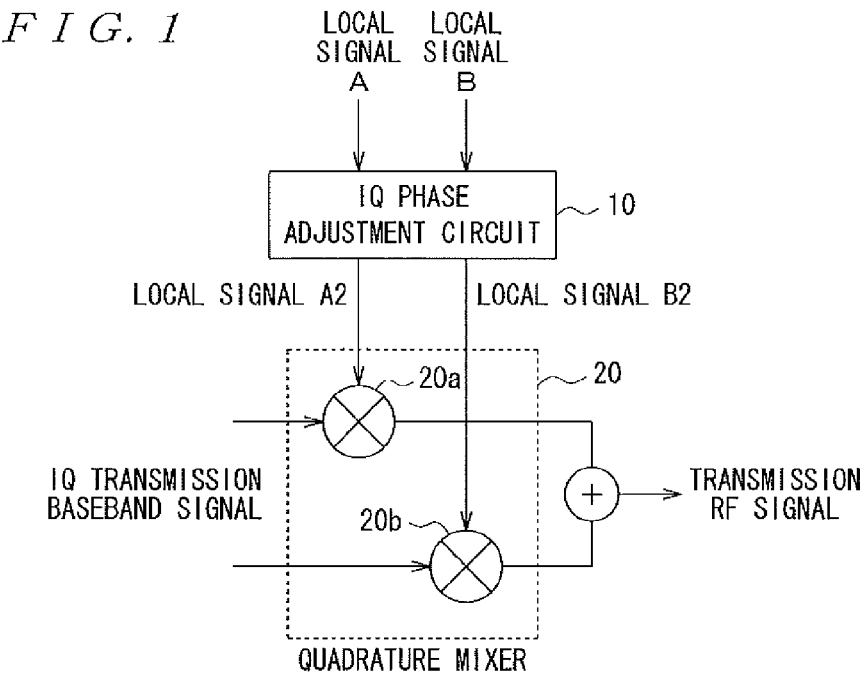
FIG. 1 is a view illustrative of a quadrature modulation circuit according to an embodiment of the present invention.

Hereinafter, embodiments of a phase adjustment circuit according to the present invention will be described with reference to the drawings. Specifically, in each of the drawings to be referred to in the following description, the same components are indicated by the same reference numerals as those in the other drawings.

(Quadrature Modulation Circuit, Quadrature Demodulation Circuit)

Figure 2:
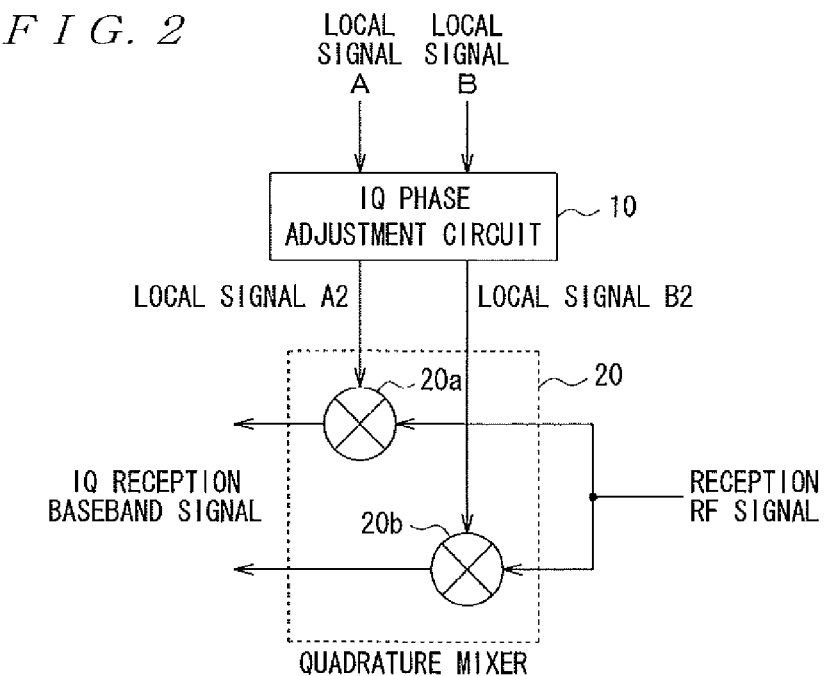
FIG. 2 is a view illustrative of a quadrature demodulation circuit according to an embodiment of the present invention.

FIG. 1 is an example of a quadrature modulation circuit by use of an IQ phase adjustment circuit according to the present embodiment. FIG. 2 is an example of a quadrature demodulation circuit by use of an IQ phase adjustment circuit according to the present embodiment. In any one of the quadrature modulation circuit of FIG. 1 and the quadrature demodulation circuit of FIG. 2, a local signal A and a local signal B, each having a phase difference from each other by approximately 90 degrees, are input into an IQ phase adjustment circuit 10, as local signals having a phase error. In the IQ phase adjustment circuit 10, a local signal A2 and a local signal B2, in which a phase error is suppressed, are input into a quadrature mixer 20. The quadrature mixer 20 is provided with: an I mixer 20a for receiving the local signal A2 as one of inputs; and a Q mixer 20b for receiving the local signal B2 as the other of the inputs.

In the quadrature modulation circuit of FIG. 1, an IQ transmission baseband signal is frequency-converted to the I mixer 20a and the Q mixer 20b, and are IQ synthesized to be output as a transmission Radio Frequency (RF) signal. In addition, in the quadrature demodulation circuit of FIG. 2, a reception RF signal is frequency-converted by the I mixer 20a and the Q mixer 20b, respectively, to be an IQ reception baseband signal.

(Configuration Example of IQ Phase Adjustment Circuit)

Figure 3:
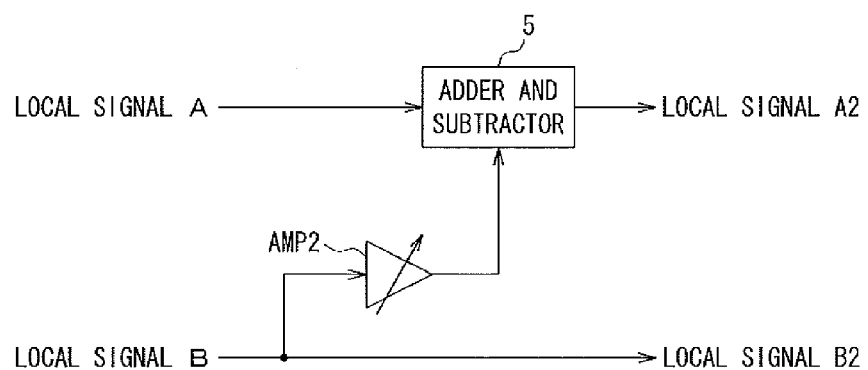
FIG. 3 is a block diagram illustrative of a configuration example of a phase adjustment circuit according to the present embodiment of the present invention.

FIG. 3 is a block diagram illustrative of a configuration example of an IQ phase adjustment circuit according to the present embodiment. The local signal B is input into a variable amplifier AMP2 (second amplifier) in which a gain is adjustable, and its output is added to or subtracted from the local signal A at an adder and subtractor (adding and subtracting unit) 5 to be output as the local signal A2. Simultaneously, the local signal B is output as the local signal B2 without change. The above local signal A2 and the above local signal B2 become IQ local signals for use in a quadrature mixer.

In this situation, in a case where the local signal A is an I local signal (first I local signal) to be input into the IQ phase adjustment circuit and the local signal B is a Q local signal (first Q local signal) to be input into the IQ phase adjustment circuit, the local signal A2 becomes an I local signal (second I local signal) to be output from the IQ phase adjustment circuit and the local signal B2 becomes a Q local signal (second Q local signal) to be output from the IQ phase adjustment circuit.

Moreover, in a case where the local signal A is a Q local signal (first Q local signal) to be input into the IQ phase adjustment circuit and the local signal B is an I local signal (first I local signal) to be input into the IQ phase adjustment circuit, the local signal A2 becomes a Q local signal (second Q local signal) to be output from the IQ phase adjustment circuit and the local signal B2 becomes an I local signal (second I local signal) to be output from the IQ phase adjustment circuit.

In this situation, as to the local signal A2, when the phase error between the local signal A and the local signal B (that is a deviation from 90 degrees in the phase difference) is set to α (α>0), the local signal A can be represented as sin (ωt−α) and the local signal B can be represented as cos ωt. When k is the gain of the variable amplifier AMP2, the local signal A2 is represented by Expression (1).

$$\sin(\omega t - \alpha) + k\cos\omega t = \cos\alpha \cdot \sin\omega t - \sin\alpha \cdot \cos\omega t + k\cos\omega t \quad (1)$$
$$= \cos\alpha \cdot \sin\omega t + (k - \sin\alpha)\cos\omega t$$
$$= \sqrt{\cos^2\alpha + (k - \sin\alpha)^2} \sin(\omega t + \beta)$$

where β is to satisfy Expression (2).

$$\tan\beta = \frac{k - \sin\alpha}{\cos\alpha} \quad (2)$$

As understood by Expression (1), when β is set to 0, the local signal A2 has a phase error 0 with the local signal B. That is to say, in this case, when k=sin α is satisfied, an addition is made in the adder and subtractor 5, so that the phase error between the local signal A2 and the local signal B2 can be eliminated.

In the phase adjustment circuit according to the present embodiment, it is possible to eliminate not only the phase error caused by an IQ mismatch included in the IQ quadrature local signal generating circuit itself but also the phase error caused by an IQ mismatch generated in a transmission path or in a circuit at a later stage, such as a quadrature mixer. In this case, in the quadrature mixer at a later stage, for example, when there is a phase error of 1 degree, the gain k is determined so that β becomes −1 degree (in other words, the phase difference between the local signal A2 and the local signal B2 is 89 degrees). It is therefore possible to make the phase error 0 in the entirety of the quadrature modulation circuit and the quadrature demodulation circuit.

In this situation, in consideration of a case where α=0, that is, the phase error is 0 in a circuit at a former stage of the phase adjustment circuit according to the present embodiment, k=tan β is satisfied. When the circuit at the later stage has a positive phase error, β has a negative value. When the circuit at the later stage has a negative phase error, β has a positive value. β having a negative value may be multiplied by the absolute value of tan β at the variable amplifier AMP2 and a subtraction is made at the adder and subtractor 5, or may be multiplied by tan β at the variable amplifier AMP2 and an addition is made at the adder and subtractor 5. On the other hand, β having a positive value may be multiplied by tan β at the variable amplifier AMP2 and added at the adder and subtractor 5.

The fine adjustment of the gain k enables a precise phase adjustment. Since the constant gain k makes the phase adjustment amount constant regardless of the frequency, it is easily possible to adjust the local signal operating in a wide frequency range, for example, from several MHz to several GHz, with high accuracy.

In particular, it is possible to adjust the phase so that the phase error become 0, resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

Specifically, a difference in amplitude is generated between the local signal A2 and the local signal B2 in the synthesis. However, in general, since α of the local signal generated for the IQ quadrature modulation/demodulation circuit is sufficiently smaller than 90 degrees, that is, cos α in Equation (1) is approximately 1, the amplitude $$\sqrt{\cos^2\alpha + (k-\sin\alpha)^2}$$

of the local signal A2 is approximately 1 and the amplitude difference with the local signal A2 is extremely small. Additionally, in general, the amplitude of the IQ local signal, that is, the amplitudes of the local signal A2 and the local signal B2 are sufficiently large. Since the mixer is used with the local amplitude dependency saturated, it is usually the case that such a minute amplitude difference does not a matter in the quadrature modulation circuit or the quadrature demodulation circuit.

In the above example, the case where the phase difference between the local signal A1 and the local signal B1 exceeds 90 degrees has been described. In contrast, in a case where there is a phase difference smaller than 90 degrees, the local signal A2 is represented by Expression (3), where phase difference is α (α>0), k is the gain of the variable amplifier AMP2, sin (ωt+α) is the local signal A, and cos ωt is the local signal B.

$$\sin(\omega t + \alpha) - k\cos\omega t = \cos\alpha \cdot \sin\omega t + \sin\alpha \cdot \cos\omega t - k\cos\omega t \quad (3)$$
$$= \cos\alpha \cdot \sin\omega t + (\sin\alpha - k)\cos\omega t$$
$$= \sqrt{\cos^2\alpha + (\sin\alpha - k)^2} \sin(\omega t + \beta)$$

However, since β is represented as follows, $$\tan\beta = \frac{\sin\alpha - k}{\cos\alpha} \quad (4)$$

k=sin α is satisfied and a subtraction is made at the adder and subtractor. Also in this case, it is possible to correct the phase difference at 90 degrees.

Specifically, this addition and subtraction do not matter in a reversed configuration.

Figure 4:
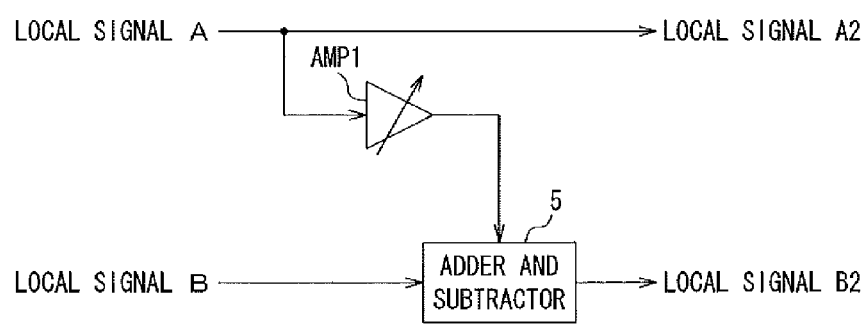
FIG. 4 is a block diagram illustrative of another configuration example of the phase adjustment circuit according to the present embodiment of the present invention.

In other words, the IQ phase adjustment circuit may be configured as illustrated in FIG. 4. That is, the local signal A is input into the variable amplifier AMP1 (first amplifier), and its output is added to or subtracted from the local signal B at adder and subtractor (adding and subtracting unit) to be output as the local signal A2. Simultaneously, the local signal A may be output as the local signal A2 without change.

In this situation, when the local signal A is an I local signal (first I local signal) to be input into the IQ phase adjustment circuit and the local signal B is a Q local signal (first Q local signal) to be input into the IQ phase adjustment circuit, the local signal A2 is an I local signal (second I local signal) to be output from the IQ phase adjustment circuit and the local signal B2 is a Q local signal (second Q local signal) to be output from the IQ phase adjustment circuit.

In addition, when the local signal A is a Q local signal (first Q local signal) to be input into the IQ phase adjustment circuit and the local signal B is an I local signal (first I local signal) to be input into the IQ phase adjustment circuit, the local signal A2 is a Q local signal (second Q local signal) to be output from the IQ phase adjustment circuit and the local signal B2 is an I local signal (second I local signal) to be output from the IQ phase adjustment circuit.

The phase adjustment circuit illustrated in FIG. 4 is similar to that illustrated in FIG. 3. Therefore, the same effects as those of the phase adjustment circuit illustrated in FIG. 3 are obtainable. That is, the fine adjustment of the gain k enables the precise phase adjustment. Since the constant gain k makes the phase adjustment amount constant regardless of the frequency, it is easily possible to adjust the local signal operating in a wide frequency range, for example, from several MHz to several GHz, with high accuracy.

In particular, it is possible to adjust the phase so that the phase error becomes 0, resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Another Configuration Example of IQ Phase Adjustment Circuit)

Figure 5:
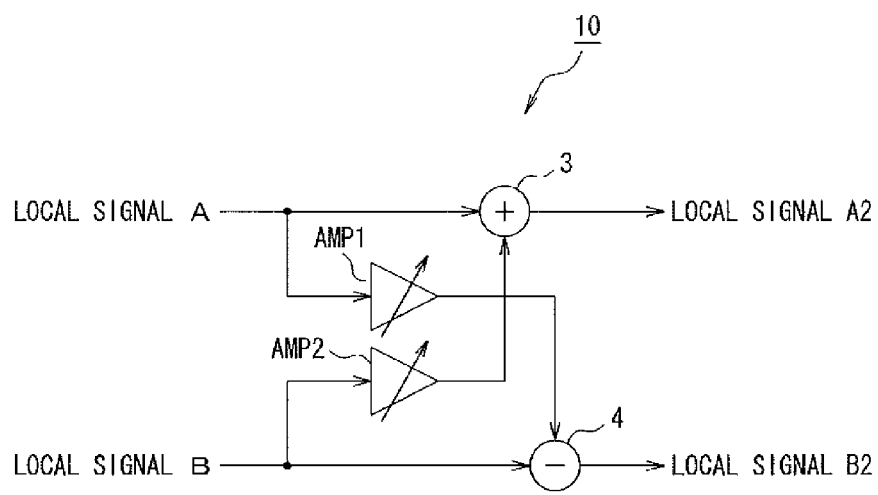
FIG. 5 is a block diagram illustrative of another configuration example of the phase adjustment circuit according to the present embodiment of the present invention.

FIG. 5 is a block diagram illustrative of another configuration example of an IQ phase adjustment circuit according to the present embodiment. The local signal A is input into the variable amplifier AMP1 in which the gain is adjustable, and its output is subtracted from the local signal B at a subtractor 4 to be output as the local signal B2. Likewise, the local signal B is input into the variable amplifier AMP2 in which the gain is adjustable, and its output is added to the local signal A at an adder 3 to be output as the local signal A2. The above local signal A2 and the above local signal B2 become the IQ local signals for use in a quadrature mixer.

In this situation, when the local signal A is an I local signal (first I local signal) to be input into the IQ phase adjustment circuit and the local signal B is a Q local signal (first Q local signal) to be input into the IQ phase adjustment circuit, the local signal A2 is an I local signal (second I local signal) to be output from the IQ phase adjustment circuit and the local signal B2 is a Q local signal (second Q local signal) to be output from the IQ phase adjustment circuit.

In addition, when the local signal A is a Q local signal (first Q local signal) to be input into the IQ phase adjustment circuit and the local signal B is an I local signal (first I local signal) to be input into the IQ phase adjustment circuit, the local signal A2 is a Q local signal (second Q local signal) to be output from the IQ phase adjustment circuit and the local signal B2 is an I local signal (second I local signal) to be output from the IQ phase adjustment circuit.

In this situation, when the phase error between the local signal A and the local signal B (that is a deviation from 90 degrees in the phase difference) is set to α (α>0), the local signal A can be represented as sin (ωt−α) and the local signal B can be represented as cos ωt. When k is the gain of the variable amplifier AMP2, the local signal A2 becomes Expression (1) described above. Also in this case, by setting β to 0, the local signal A2 has a phase error with respect to the local signal B. That is to say, in this case, k=sin α is set and the local signal A is not synthesized with the local signal B (that is, the gain of the variable amplifier AMP2 is set to 0), so that the local signal B is used as the local signal B2 without change. This eliminates the phase error between the local signal A2 and the local signal B2.

In the IQ phase adjustment circuit according to the present embodiment, it is possible to eliminate not only the phase error caused by an IQ mismatch included in the IQ quadrature local signal generating circuit itself as described above but also the phase error caused by an IQ mismatch generated in a transmission path or in a circuit at a later stage, such as a quadrature mixer. In this case, in the quadrature mixer at a later stage, for example, when there is a phase error of −1 degree, the gain k is determined so that β is 1 degree (in other words, the phase difference between the local signal A2 and the local signal B2 is 91 degrees). It is therefore possible to make the phase error 0 in the entirety of the quadrature modulation circuit and the quadrature demodulation circuit.

In this situation, when α=0, that is, when the phase error is 0 in a circuit at a former stage of the phase adjustment circuit according to the present embodiment, k=tan β is satisfied. When the circuit at a later stage has a negative phase error, β has a positive value. It is made possible to make the phase error 0 caused by an IQ mismatch generated in a circuit at a later stage, by multiplying tan β at the variable amplifier AMP2 and addition is made at the adder 3.

In the above example, the case where the phase difference between the local signal A1 and the local signal B1 exceeds 90 degrees has been described. In contrast, in a case where the phase difference is smaller than 90 degrees, the local signal B2 is represented by Expression (5) where k is the gain of the variable amplifier AMP2, sin ωt is the local signal A, and cos(ωt−α) is the local signal B.

$$\cos(\omega t - \alpha) - k\sin\omega t = \cos\omega t \cdot \cos\alpha + \sin\omega t \cdot \sin\alpha - k\sin\omega t \quad (5)$$
$$= \cos\alpha \cdot \cos\omega t + (\sin\alpha - k)\sin\omega t$$
$$= \sqrt{\cos^2\alpha + (\sin\alpha - k)^2}\,\sin(\omega t + \beta)$$

However, since β is represented by Expression (4), it is possible to correct the phase difference at 90 degrees also in this case, where the gain k of the variable amplifier AMP2 is set such that k=sin α, the gain of the variable amplifier AMP1 is set to 0, and the local signal A is used as the local signal A2 without change.

In the phase adjustment circuit according to the present embodiment, it is possible to eliminate not only the phase error caused by an IQ mismatch included in the IQ quadrature local signal generating circuit itself but also the phase error caused by an IQ mismatch generated in a transmission path or a circuit at a later stage, such as an quadrature mixer. In this case, in the quadrature mixer at a later stage, for example, when there is a phase error of 1 degree, the gain k is determined so that β is −1 degree (in other words, so that the phase difference between the local signal A2 and the local signal B2 is 89 degrees).

It is therefore possible to make the phase error 0 in the entire quadrature modulation circuit and quadrature demodulation circuit.

In this situation, in consideration of a case where α=0, that is, where the phase error is 0 in a circuit at a former stage of the phase adjustment circuit according to the present embodiment, k=tan β is satisfied. When the circuit at a later stage has a positive phase error, β has a negative value. It is made possible to make the phase error 0, the phase error being caused by an IQ mismatch generated in a circuit at a later stage, by multiplying the absolute value of tan β at the variable amplifier AMP1 and a subtraction is made at the subtractor 4.

Generally speaking, the phase error in an IQ quadrature local signal may take either a positive or negative value. In order to handle this, a configuration of FIG. 5 is employed in the present example. That is, an output from one variable amplifier AMP1 is subtracted from the local signal B, and an output from the other variable amplifier AMP2 is added to the local signal A. With this configuration, in both of the case where the phase difference is larger than 90 degrees and the case where the phase difference is smaller than 90 degrees (that is, according to the positive or negative value of the phase error), it is made possible to realize the correction to 90 degrees of the phase difference by operating either the variable amplifier AMP1 or the variable amplifier AMP2.

Figure 6:
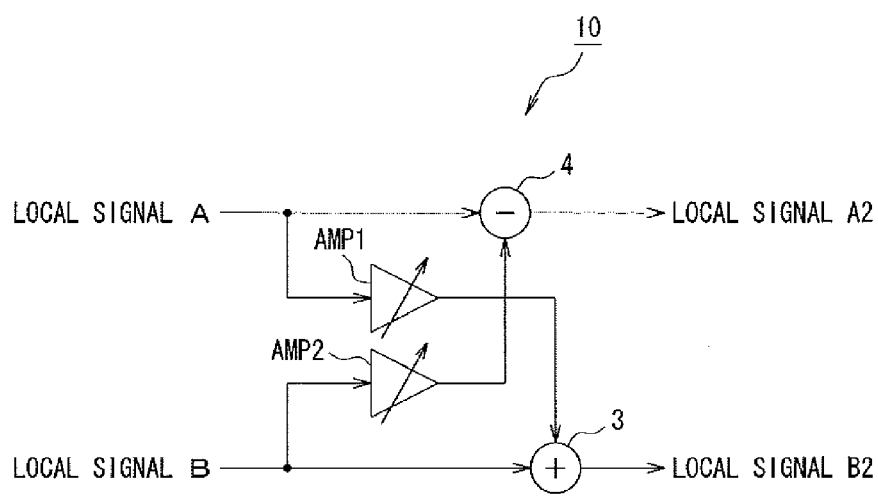
FIG. 6 is a block diagram illustrative of another configuration example of the phase adjustment circuit according to the present embodiment of the present invention.

Specifically, the above addition and subtraction can be reversely configured. In other words, as illustrated in FIG. 6, it may be configured such that the output from one variable amplifier AMP1 is added to the local signal B, and the output from the other variable amplifier AMP2 is subtracted from the local signal A. In this situation, when the local signal A is an I local signal (first I local signal) to be input into the IQ phase adjustment circuit and the local signal B is a Q local signal (first Q local signal) to be input into the IQ phase adjustment circuit, the local signal A2 is an I local signal (second I local signal) to be output from the IQ phase adjustment circuit and the local signal B2 is a Q local signal (second Q local signal) to be output from the IQ phase adjustment circuit.

In addition, when the local signal A is a Q local signal (first Q local signal) to be input into the IQ phase adjustment circuit and the local signal B is an I local signal (first I local signal)

to be input into the IQ phase adjustment circuit, the local signal A2 is a Q local signal (second Q local signal) to be output from the IQ phase adjustment circuit and the local signal B2 is an I local signal (second I local signal) to be output from the IQ phase adjustment circuit.

In short, according to the present invention, since one is addition and the other is subtraction, it is possible to handle each case where the phase error is a positive or negative value. That is, one of the gains of the variable amplifier AMP1 and the variable amplifier AMP2 is set to 0 in accordance with a positive or negative value of the phase error that is an error deviating from 90 degrees of the phase difference between the local signal A and the local signal B.

The phase adjustment circuit illustrated in FIG. 6 is similar to that illustrated in FIG. 5. Therefore, the same effects as those of the phase adjustment circuit illustrated in FIG. 5 are obtainable. That is, the fine adjustment of the gain k enables precise phase adjustment. Since the constant gain k makes the phase adjustment amount constant regardless of the frequency, it is easily possible to adjust the local signal operating at a wide frequency range, for example, from several MHz to several GHz, with high accuracy.

In particular, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

Furthermore, in the above embodiment, the case where the gain of either one of the variable amplifier AMP1 and the variable amplifier AMP2 is set to 0 has been described. However, in the phase adjustment circuit illustrated in FIG. 5 and FIG. 6, both of the variable amplifier AMP1 and the variable amplifier AMP2 are permitted to have the gains. That is, the phase can be adjusted by distributing the correction amount of the phase error to the local signal A2 and the local signal B2 with the gains being available at the variable amplifier AMP1 and the variable amplifier AMP2. In particular, equal distribution makes equal the amplitude of the local signal A2 and that of the local signal B2, in addition to the above-described effects.

Moreover, the gains of the variable amplifier AMP1 and the variable amplifier AMP2 illustrated in FIG. 3 to FIG. 6 can be set so that the phase error is 0, by measuring beforehand the phase error from the output signal from a circuit at a later stage including the quadrature mixer in the quadrature modulation circuit or the quadrature demodulation circuit. That is, the variable amplifier AMP1 and the variable amplifier AMP2 each serve as an amplifier for a fixed gain after the gain is set.

On the other hand, the phase error obtained from the output signal from a circuit at a later stage including the quadrature mixer in the quadrature modulation circuit or the quadrature demodulation circuit is fed back to the variable amplifier AMP1 and the variable amplifier AMP2, so that the gain can be set automatically. That is, the variable amplifier AMP1 and the variable amplifier AMP2 each serve as an amplifier for a variable gain.

Either when the variable amplifier AMP1 and the variable amplifier AMP2 each serve as an amplifier for a fixed gain or for a variable gain after the gain is set, the fine adjustment of the gain k enables precise phase adjustment. Since the constant gain k makes the phase adjustment amount constant regardless of the frequency, it is easily possible to adjust the local signal operating at a wide frequency range, for example, from several MHz to several GHz, with high accuracy.

In particular, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Variable Amplifier by Use of Differential Circuit)

Figure 7:
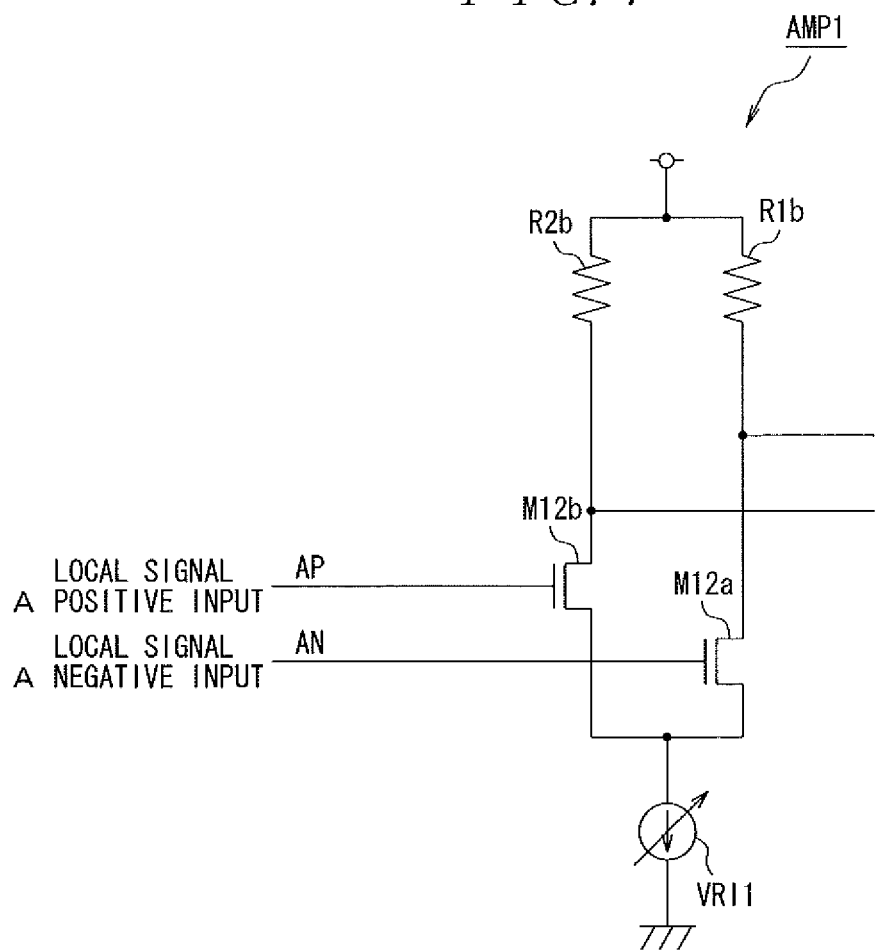
FIG. 7 is a view illustrative of a configuration example of a variable amplifier realized by use of a differential circuit.

FIG. 7 is a view illustrative of a configuration by use of a differential circuit, as an example of a concrete circuit for realizing a variable amplifier. In this configuration, the current amount of a current source VRI1 is finely adjusted, so that a gain of an amplifier composed of transistors M12a and M12b and load resistors R2a and R2b. In FIG. 7, the current of the current source VRI1 is supplied to the transistors M12a and M12b and load resistors R2a and R2b. The gain of this variable amplifier is represented by a product of a mutual conductance value of the transistors M12a and M12b and the load resistors R2a and R2b. For this reason, the gain of the amplifier can be adjusted finely, by finely adjusting the current amount of the current source VRI1 that determines the mutual conductance value.

In order to increase the gain of the variable amplifier, the mutual conductance value of the transistors M12a and M12b should be increased. Thus, the current amount should be increased. In contrast, in order to decrease the gain of the variable amplifier, the mutual conductance value of the transistors M12a and M12b should be decreased. Thus, the current amount should be decreased.

(Another Configuration Example of IQ Phase Adjustment Circuit)

Figure 8:
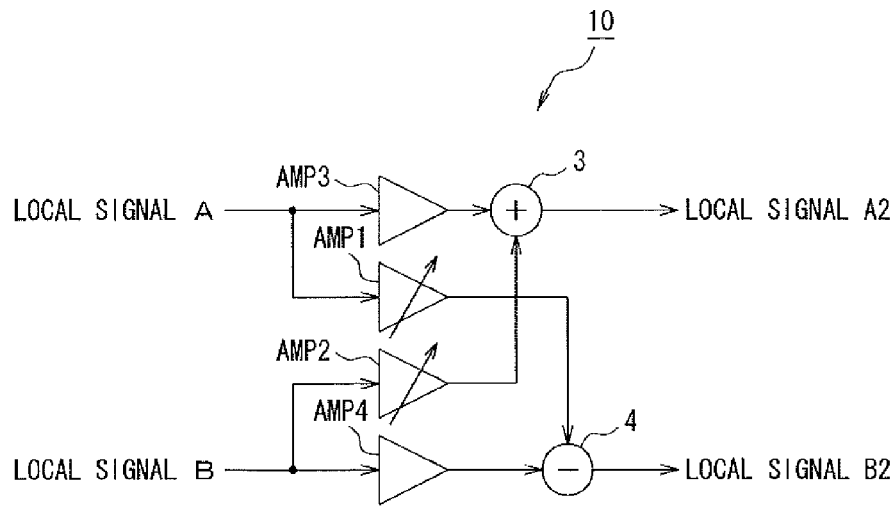
FIG. 8 is a block diagram illustrative of another configuration example of the phase adjustment circuit according to the present embodiment of the present invention.

FIG. 8 is a block diagram illustrative of another configuration example of an IQ phase adjustment circuit according to the present embodiment. In FIG. 8, the local signal A is input into the variable amplifier AMP1 in which the gain is adjustable, and is also input into a variable amplifier AMP3 having an arbitrary gain. Likewise, the local signal B is input into the variable amplifier AMP2 in which the gain is adjustable, and is also input into a variable amplifier AMP4 having an arbitrary gain. Then, the output from the variable amplifier AMP1 is subtracted from the output from the amplifier AMP4 at the subtractor 4 to be output as the local signal B2. Simultaneously, the output from the variable amplifier AMP2 is added to the output from the amplifier AMP3 at the adder 3 to be output as the local signal A2.

In this situation, in a case where the local signal A is an I local signal (first I local signal) to be input into the IQ phase adjustment circuit and the local signal B is a Q local signal (first Q local signal) to be input into the IQ phase adjustment circuit, the local signal A2 becomes an I local signal (second I local signal) to be output from the IQ phase adjustment circuit and the local signal B2 becomes a Q local signal (second Q local signal) to be output from the IQ phase adjustment circuit.

Moreover, in a case where the local signal A is a Q local signal (first Q local signal) to be input into the IQ phase adjustment circuit and the local signal B is an I local signal (first I local signal) to be input into the IQ phase adjustment circuit, the local signal A2 becomes a Q local signal (second Q local signal) to be output from the IQ phase adjustment circuit and the local signal B2 becomes an I local signal (second I local signal) to be output from the IQ phase adjustment circuit.

Figure 9:
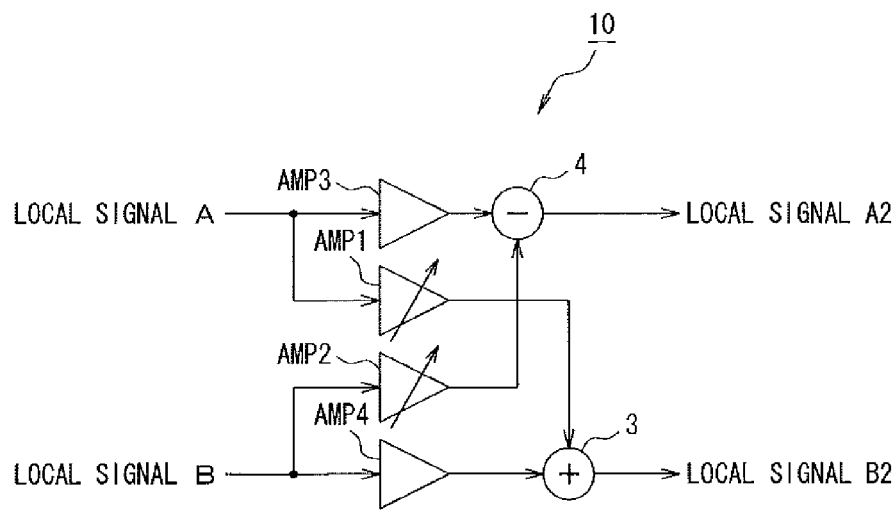
FIG. 9 is a block diagram illustrative of another configuration example of the phase adjustment circuit according to the present embodiment of the present invention.

Specifically, this addition and subtraction are enabled in an opposite configuration. In other words, the IQ phase adjustment circuit may be configured as illustrated in FIG. 9. That is, in FIG. 9, the local signal A is input into the variable amplifier AMP1 in which the gain is adjustable, and is also input into the amplifier AMP3 having an arbitrary gain. Simultaneously, the local signal B is input into the variable amplifier AMP2 in which the gain is adjustable, and is also input into the amplifier AMP4 having an arbitrary gain. Then, the output from the variable amplifier AMP1 is added to the output from the amplifier AMP4 at the adder 3 to be output as the local signal B2. Simultaneously, the output from the variable amplifier AMP2 is subtracted from the output from the amplifier AMP3 at the subtractor 4 to be output as the local signal A2.

In this situation, in a case where the local signal A is an I local signal (first I local signal) to be input into the IQ phase adjustment circuit and the local signal B is a Q local signal (first Q local signal) to be input into the IQ phase adjustment circuit, the local signal A2 becomes an I local signal (second I local signal) to be output from the IQ phase adjustment circuit and the local signal B2 becomes a Q local signal (second Q local signal) to be output from the IQ phase adjustment circuit.

Moreover, in a case where the local signal A is a Q local signal (first Q local signal) to be input into the IQ phase adjustment circuit and the local signal B is an I local signal (first I local signal) to be input into the IQ phase adjustment circuit, the local signal A2 becomes a Q local signal (second Q local signal) to be output from the IQ phase adjustment circuit and the local signal B2 becomes an I local signal (second I local signal) to be output from the IQ phase adjustment circuit.

In this case, the local signal A is amplified by the amplifier AMP3 and the local signal B is amplified by the amplifier AMP4. Therefore, the output signals from the variable amplifier AMP1 and the variable amplifier AMP2 have relatively small amplitudes with respect to the output signals from the amplifier AMP3 and the amplifier AMP4, respectively. Accordingly, the fine phase adjustment is enabled without fine adjustment of the gain k of the variable amplifier AMP1 and that of the variable amplifier AMP2.

Also in this case, since the constant gain k makes the phase adjustment amount constant regardless of the frequency, it is easily possible to adjust the local signal operating at a wide frequency range, for example, from several MHz to several GHz, with high accuracy.

In particular, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(IQ Phase Adjustment Circuit by Use of Differential Circuit)

Figure 10:
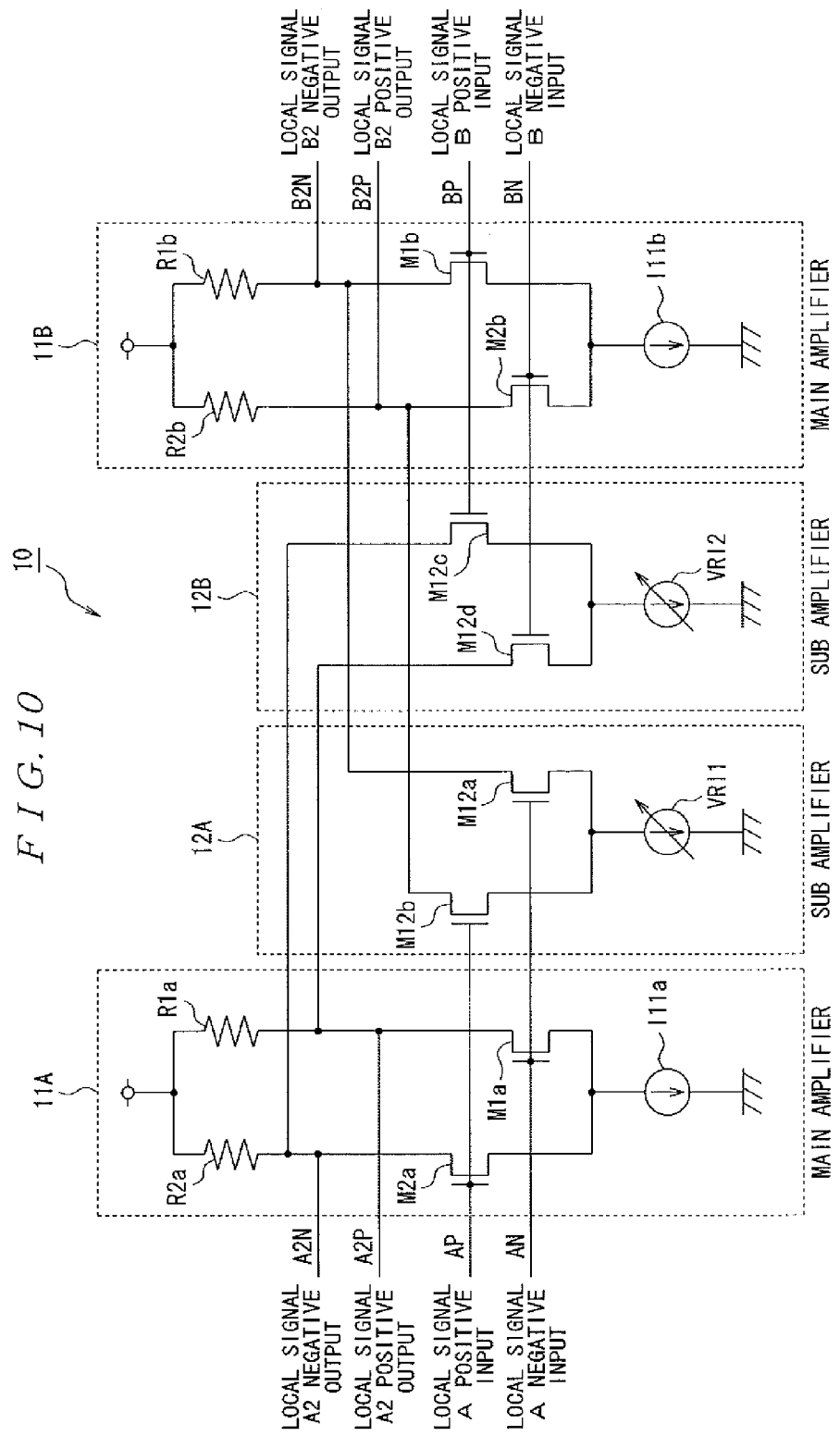
FIG. 10 is a view illustrative of a configuration example of a phase adjustment circuit achieved by use of a differential circuit.

FIG. 10 is a view illustrative of a configuration by use of a differential circuit, as an example of a concrete circuit for realizing the IQ phase adjustment circuit in the example illustrated in FIG. 8 and FIG. 9. In general, an IQ local signal to be used in a quadrature mixer is amplified by an amplifier, in many cases. This is because the IQ local signal is used with the frequency conversion efficiency saturated in order to suppress a difference in the gain between IQ in the mixer or a variation of the gain between manufactured individual differences. In this circuit example, such a point is focused on, so that the phase of the local signal is easily adjusted by utilizing the amplifier necessary for the signal amplification.

A main amplifier 11A indicated by a dotted line of FIG. 10 (corresponding to the amplifier AMP3 in FIG. 8 and FIG. 9) and a main amplifier 11B indicated by a dotted line of FIG. 10 (corresponding to the amplifier AMP4 in FIG. 8 and FIG. 9) are originally main amplifiers necessary for amplification of the local signals. The main amplifier 11A is composed of: a transistor M2a in which a local signal A positive signal (positive signal) AP is applied to the gate thereof; a resistor R2a; a transistor M1a in which a local signal A negative signal (negative signal) AN is applied to the gate thereof; a resistor R1a; and a current source I11a, and the main amplifier 11A outputs a local signal A2 positive signal A2P and a local signal A2 negative signal A2N. The main amplifier 11B is composed of: a transistor M1b in which a local signal B positive signal BP is applied to the gate thereof; a resistor R1b; a transistor M2b in which a local signal B negative signal BN is applied to the gate thereof; a resistor R2b; and a current source I11b, and the main amplifier 11B outputs a local signal B2 positive signal B2P and a local signal B2 negative signal B2N.

In the present example, in addition to the main amplifiers 11A and 11B, there are provided a sub-amplifier 12A (corresponding to the amplifier AMP1 in FIG. 8 and FIG. 9) and a sub-amplifier 12B (corresponding to the amplifier AMP2 in FIG. 8 and FIG. 9) each having the same configuration as that of the main amplifier. The above sub-amplifiers 12A and 12B have functions of the adder 3 and the subtractor 4 in FIG. 8 and FIG. 9, respectively.

Out of the transistors M12a and M12b included in the sub-amplifier 12A, the output from the transistor M12b, into which the local signal A positive signal (positive signal) is input, is connected to a local signal B2 positive signal output, whereas the output from the transistor M12a into which the local signal A negative signal (negative signal) is input is connected to a local signal B2 negative signal output.

Out of the transistors M12c and M12d included in the sub-amplifier 12B, the output from the transistor M1b into which the local signal B positive signal is input is connected to the local signal A2 negative signal output, whereas the output from the transistor M2b into which the local signal B negative signal is input is connected to a local signal A2 positive signal output.

With such a connection configuration, the current outputs from the main amplifiers 11A and 11B and the sub-amplifiers 12A and 12B can be added and subtracted.

In other words, the adding and subtracting unit is achievable by wire-connecting the outputs from the main amplifiers 11A and 11B and those from the sub-amplifiers 12A and 12B. Hence, the phase adjustment circuit can be realized with a simple configuration.

In addition, bias currents are adjusted by variable current sources VRI1 and VRI2 of the sub-amplifiers 12A and 12B to adjust the gains of the sub-amplifiers 12A and 12B, respectively. It is thus made possible to achieve the IQ phase adjustment circuit with ease, by merely adding the sub-amplifiers 12A and 12B to the amplifiers which are originally necessary.

Furthermore, transistors having per-size mutual conductance identical to the transistors used for the main amplifiers 11A and 11B are used for the sub-amplifiers 12A and 12B, and in addition, the current amounts of the current sources I11a and A11b of the main amplifiers 11A and 11B and those of the variable current sources VRI1 and VRI2 match to operate together. Therefore, even if the gains of the main amplifiers 11A and 11B are changed by the temperature or power supply voltage, the gains of the sub-amplifiers 12A and 12B are also changed. It is thus easy to make constant the adjustment amount of the phase.

Accordingly, it is made possible to adjust the local signal that operates at a wide frequency range, for example, from several MHz to several GHz, with high accuracy.

In particular, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Circuit Arrangement Example)

Figure 11:
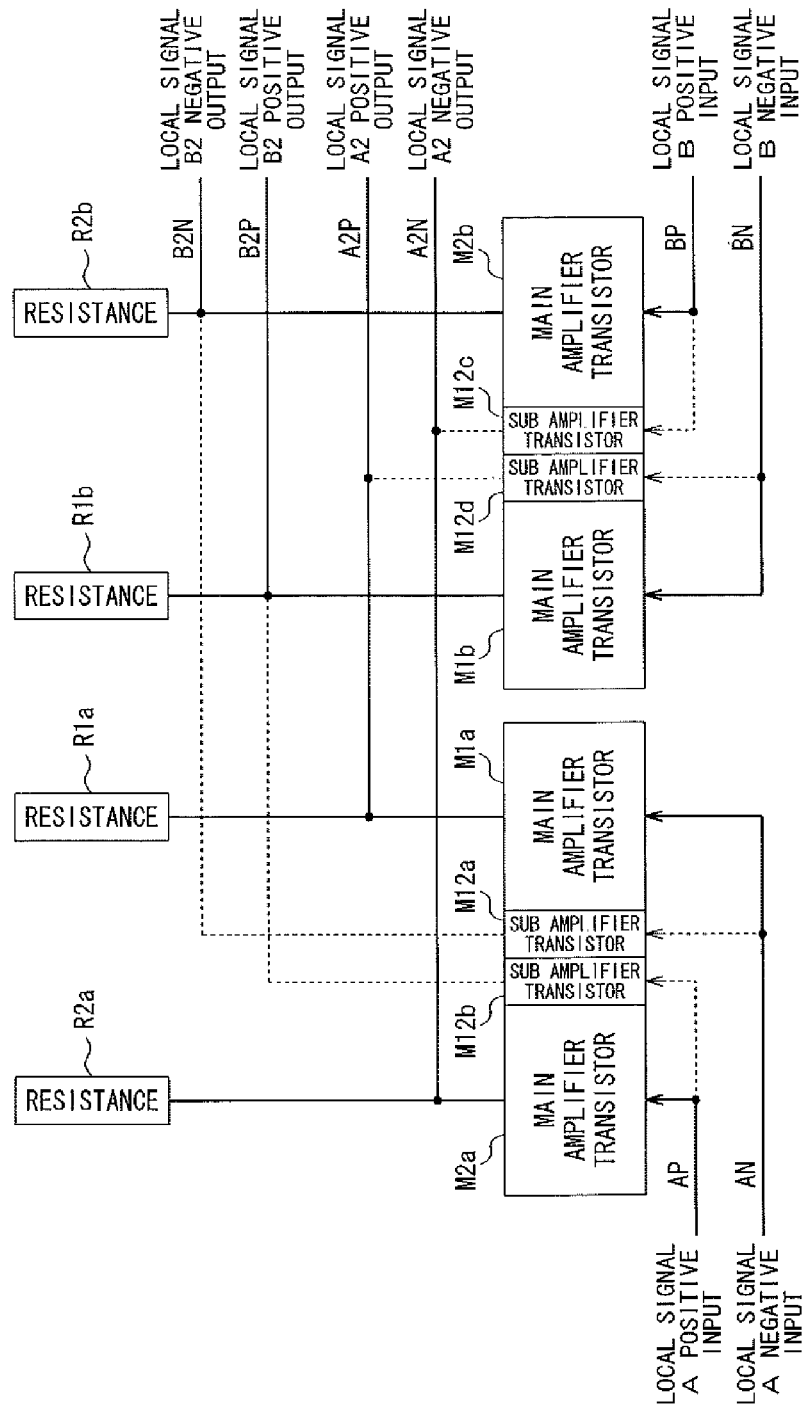
FIG. 11 is an image view illustrative of a circuit arrangement example in a case where the circuit of FIG. 5 is realized in a semiconductor integrated circuit.

FIG. 11 is an image view illustrative of a circuit arrangement example in a case where the circuit of FIG. 5 is implemented in a semiconductor integrated circuit. In FIG. 11, the transistors M12a, M12b, M12c, and M12d constituting the sub-amplifiers 12A and 12B are arranged in association with the transistors M1a, M2a, M1b, and M2b of the main amplifier, respectively. The present circuit arrangement has a characteristic that an adder and a subtractor can be configured by merely adding simple wiring as indicated by dotted lines. In general, the gain of the sub-amplifier is only cos α times (where α is a phase error amount) with respect to the gain of the main amplifier. Therefore, the sub-amplifier can be realized by a transistor smaller than the main amplifier. This indicates that the circuit of FIG. 10 can be achieved in a very small-sized area, when it is implemented in a semiconductor integrated circuit. The IQ phase adjustment circuit of the present example can be realized with ease by adding the current source circuit to the core circuit configuration of FIG. 11 in a usual method.

(Connection of Frequency Divider)

Figure 12:
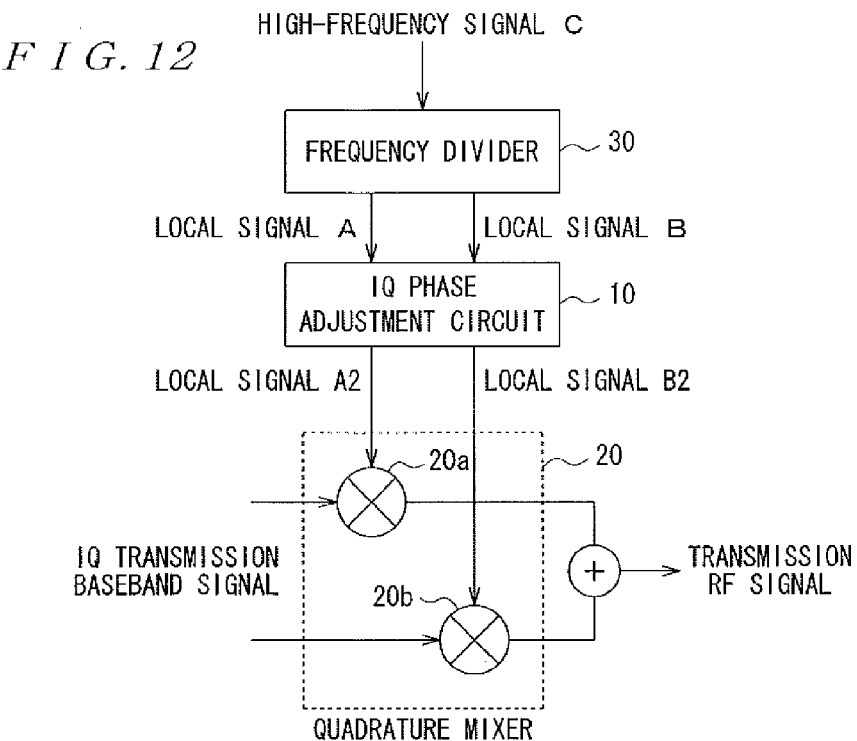
FIG. 12 is a block diagram illustrative of a configuration example of an IQ phase adjustment circuit equipped with a phase adjustment circuit realized by a frequency divider.
Figure 13:
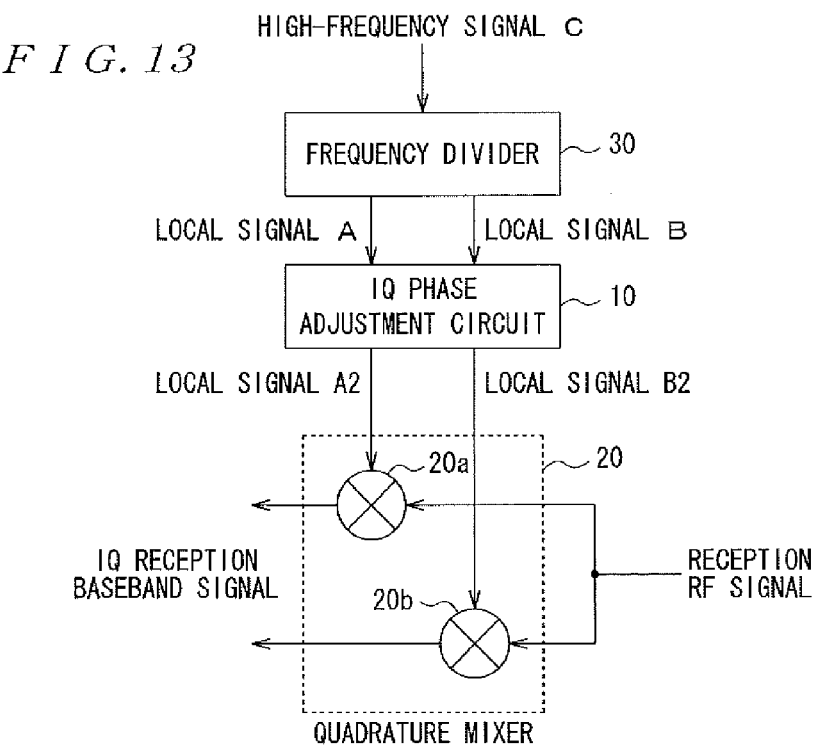
FIG. 13 is a view illustrative of a configuration example of the IQ phase adjustment circuit equipped with the phase adjustment circuit realized by the frequency divider.

Generally, in the quadrature modulator and the quadrature demodulator, in many cases, a double- or quadruple-frequency signal of a desired local frequency is provided so that the signal is divided to have a half or quarter frequency to generate IQ local signals each having a phase difference of 90 degrees from each other. The quadrature modulator of this case is illustrated in FIG. 12 and the quadrature demodulator of this case is illustrated in FIG. 13. In any of the quadrature modulator in FIG. 12 and the quadrature demodulator in FIG. 13, the local signals A2 and B2 obtained by a frequency divider (frequency dividing unit) 30 are input into the mixers 20a and 20b in the quadrature mixer 20.

In a case where the frequency divider 30 is a half frequency divider, a high-frequency signal C having a double frequency of a desired local frequency is input into the frequency divider 30 to obtain the local signal A2 and the local signal B2 each having a desired frequency and having a phase difference of 90 degrees from each other. In a case where a frequency divider 30 is a quarter frequency divider, a high-frequency signal C having a quadruple frequency of a desired local frequency is input into the frequency divider 30 to obtain the local signal A2 and the local signal B2 each having a desired frequency and having a phase difference of 90 degrees from each other. In the quadrature modulator of FIG. 12 and the quadrature demodulator of FIG. 13, this configuration is focused on so that the phase adjustment of the IQ local signal is enabled with ease by utilizing the half frequency divider or the quarter frequency divider. Specifically, in this situation, the half frequency divider or the quarter frequency divider will be described. However, the phase adjustment circuit according to the present example is achievable even in a case where the frequency divider is not the "half" frequency divider or the "quarter" frequency divider.

(Configuration Example of Half Frequency Divider)

Figure 14:
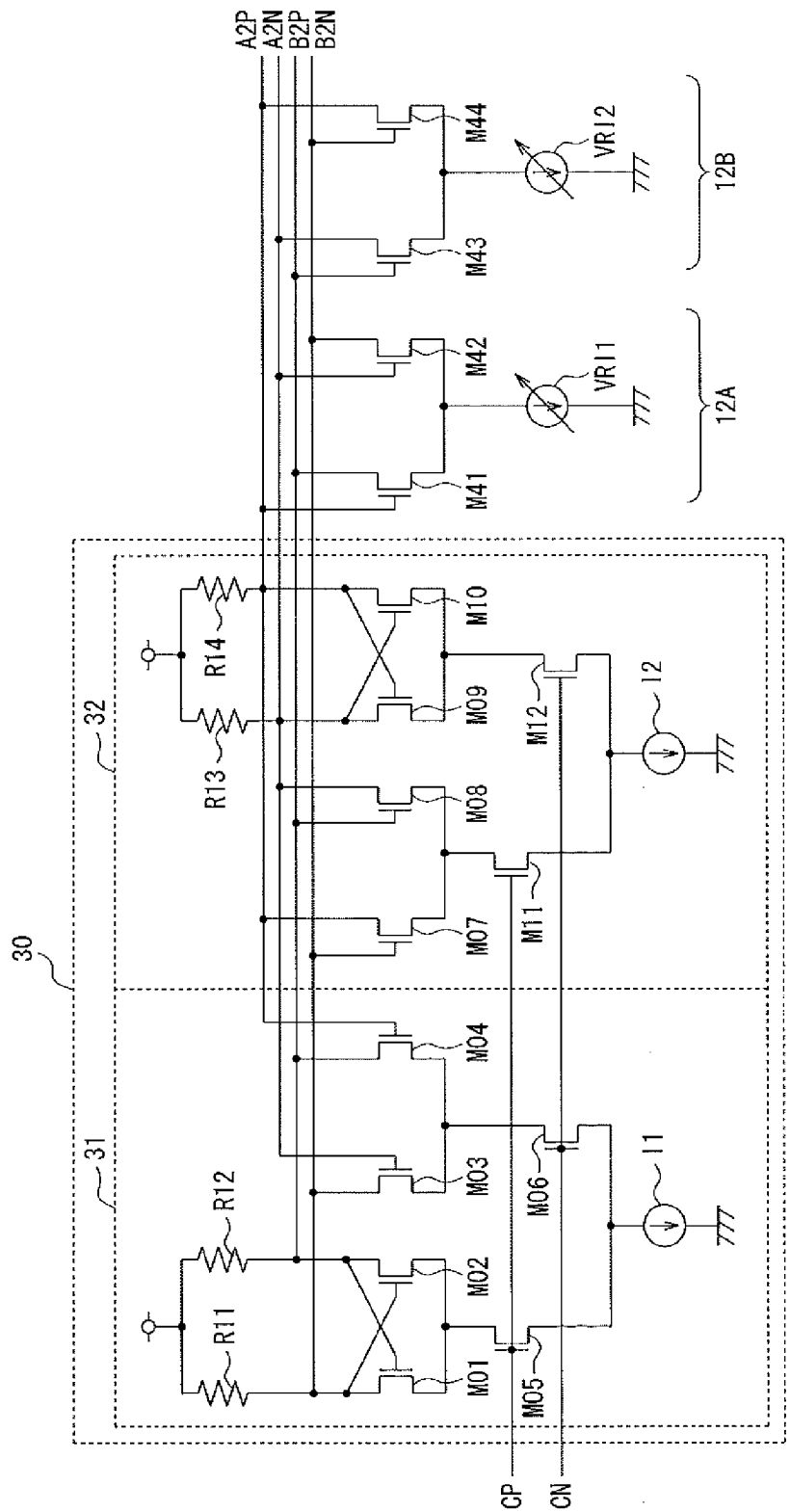
FIG. 14 is a view illustrative of a concrete circuit configuration example of the phase adjustment circuit realized by a half frequency divider.

FIG. 14 is a view illustrative of a concrete circuit configuration example of an IQ phase adjustment circuit realized by use of a half frequency divider, which is used in the quadrature modulation circuit of FIG. 12 and in the quadrature demodulation circuit of FIG. 13. The half frequency divider 30 originally necessary for generating the IQ local signals is indicated by the dotted line in FIG. 14. The half frequency divider 30 is configured such that two stages of known differential D latch circuits are combined. That is, in FIG. 14, the half frequency divider 30 is composed of differential D latch circuits 31 and 32 combined at two stages.

The differential D latch circuit 31 includes: a hold unit composed of transistors M01 and M02 and resistors R11 and R12; a latch unit composed of transistors M03 and M04; a transistor M05 in which a high-frequency signal C positive input CP is applied to the gate thereof; a transistor M06 in which a high-frequency signal C negative input CN is applied to the gate thereof; and a constant current source I1.

The differential D latch circuit 32 includes: a hold unit composed of transistors M09 and M10 and resistors R13 and R14; a latch unit composed of transistors M07 and M08; a transistor M11 in which the high-frequency signal C positive input CP is applied to the gate thereof; a transistor M12 in which the high-frequency signal C negative input CN is applied to the gate thereof; and a constant current source I2.

In the differential D latch circuit 31 and the differential D latch circuit 32, an output from one of them is an input into the other of them. Then, the differential D latch circuit 31 and the differential D latch circuit 32 each operate as a D latch circuit with the high-frequency signal C positive input CP and the high-frequency signal C negative input CN used as a clock, and each operate as a half frequency divider.

Also in the circuit configuration of FIG. 14, two sub-amplifiers 12A and 12B are provided. Out of the transistors included in the sub-amplifier 12A, the output from the transistor M41 into which the local signal A2 positive signal A2P is input to the gate thereof is connected to the output from the local signal B2 positive signal B2P, whereas the output from the transistor M42 into which the local signal A2 negative signal A2N is input is connected to the output from the local signal B2 negative signal B2N. In addition, as to transistors included in the sub-amplifier 12B, the output from the transistor M43 into which the local signal B2 positive signal B2P is input to the gate thereof is connected to the output from the local signal A2 negative signal A2N, whereas the output from the transistor into which the local signal B2 negative signal B2N is input is connected to the output from the local signal A2 positive signal A2P. By the above connections, the current outputs from the sub-amplifiers 12A and 12B are added and subtracted.

In this configuration, in the same manner as the case of FIG. 10, the adjustment of the variable current sources I1 and I2 of the sub-amplifiers 12A and 12B make it possible to adjust the gain of the sub-amplifier. It is thus possible to realize the phase adjustment circuit with ease. Furthermore, the phase error caused by an IQ mismatch in the frequency divider can be made 0.

Also in this case, it is easily possible to adjust the local signal operating at a wide frequency range, for example, from several MHz to several GHz, with high accuracy.

In particular, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Configuration Example of Quarter Frequency Divider)

Figure 15:
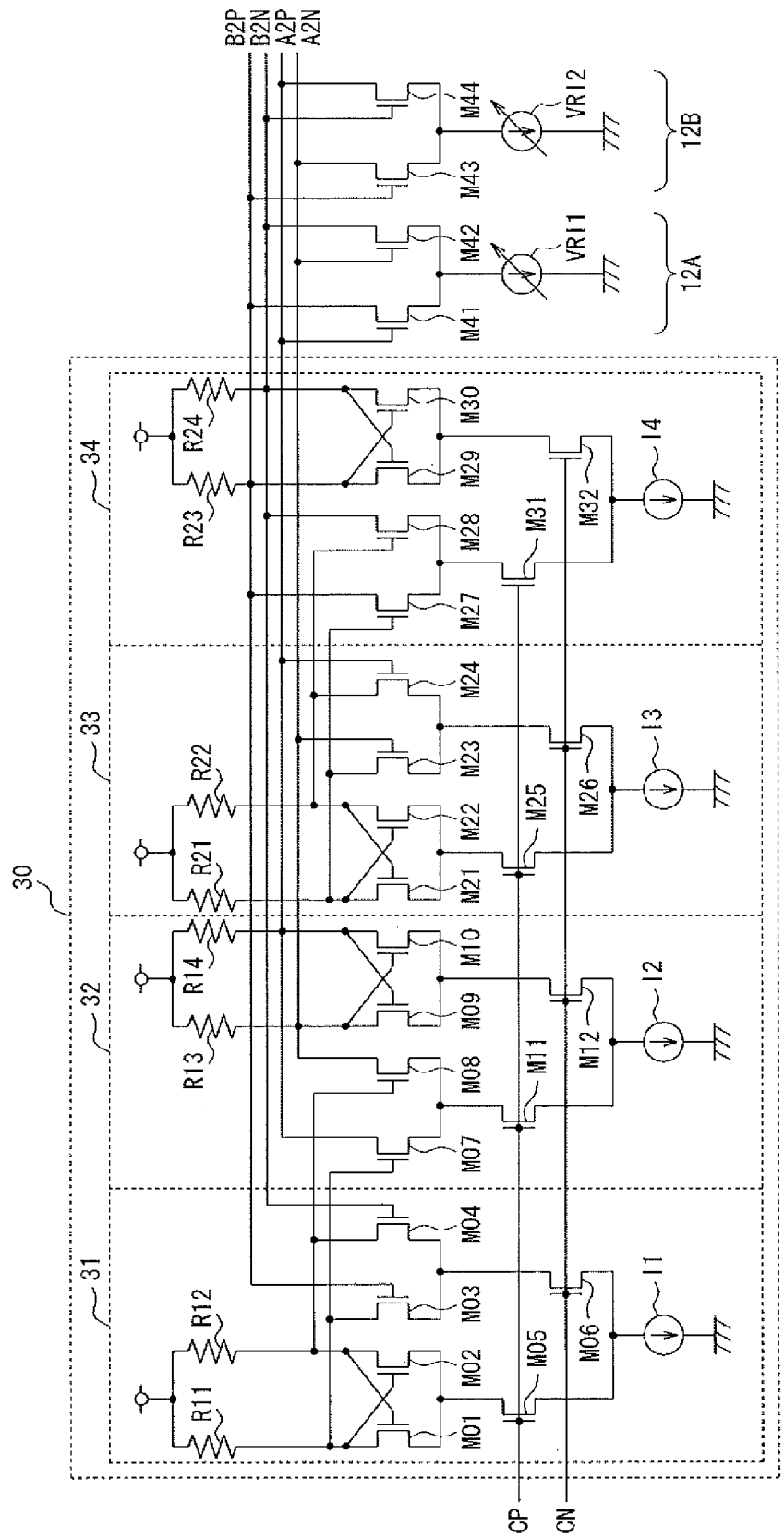
FIG. 15 is a view illustrative of a concrete circuit configuration example of the phase adjustment circuit realized by a quarter frequency divider.

FIG. 15 is a view illustrative of a concrete circuit configuration example of a quarter frequency divider, which is used in the quadrature modulation circuit of FIG. 12 and in the quadrature demodulation circuit of FIG. 13. The quarter frequency divider 30 originally necessary for generating the IQ local signal is indicated by the dotted line in FIG. 15. The quarter frequency divider 30 is configured such that two half frequency dividers, which have been described with reference to FIG. 14, are combined. That is, in FIG. 15, the quarter frequency divider 30 is composed of four differential D latch circuits 31, 32, 33, and 34 that are combined.

The differential D latch circuit 31 includes: the hold unit composed of the transistors M01 and M02 and the resistors R11 and R12; the latch unit composed of the transistors M03 and M04; the transistor M05 in which the high-frequency signal C positive input CP is applied to the gate thereof; the transistor M06 in which the high-frequency signal C negative input CN is applied to the gate thereof; and the constant current source I1.

The differential D latch circuit 32 includes: the hold unit composed of the transistors M09 and M10 and the resistors R13 and R14; the latch unit composed of the transistors M07 and M08; the transistor M11 in which the high-frequency signal C positive input CP is applied to the gate thereof; the transistor M12 in which the high-frequency signal C negative input CN is applied to the gate thereof; and the constant current source I2.

The differential D latch circuit 33 includes: a hold unit composed of transistors M21 and M22 and resistors R21 and R22; a latch unit composed of transistors M23 and M24; a transistor M25 in which the high-frequency signal C positive input CP is applied to the gate thereof; a transistor M26 in which the high-frequency signal C negative input CN is applied to the gate thereof; and a constant current source I3.

The differential D latch circuit 34 includes: a hold unit composed of transistors M29 and M30 and resistors R23 and R24; a latch unit composed of transistors M27 and M28; a transistor M31 in which the high-frequency signal C positive input CP is applied to the gate thereof; a transistor M32 in which the high-frequency signal C negative input CN is applied to the gate thereof; and a constant current source I4.

Also in the circuit configuration of FIG. 15, two sub-amplifiers 12A and 12B are provided and the current outputs from the sub-amplifiers 12A and 12B are added and subtracted. Then, also in the same manner as the case of FIG. 14, the adjustment of the variable current sources I1 and I2 of the sub-amplifiers 12A and 12B make it possible to adjust the gains of the sub-amplifiers. It is possible to realize the phase adjustment circuit with ease.

The present invention is not limited to the half or quarter frequency divider. An eighth frequency divider or a sixteenth frequency divider may be employed as necessary. In those cases, the sub-amplifiers are connected and the variable current source is adjusted as described above. It is thus possible to realize the phase adjustment circuit with ease. In addition, it is made possible to make the phase error 0, the phase error resulting from an IQ mismatch in the frequency divider.

Also in this case, it is easily possible to adjust the local signal operating in a wide frequency range, for example, from several MHz to several GHz, with high accuracy.

In particular, it is possible to adjust the phase so that the phase error become 0, resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Connection of Polyphase Filter)

Figure 16:
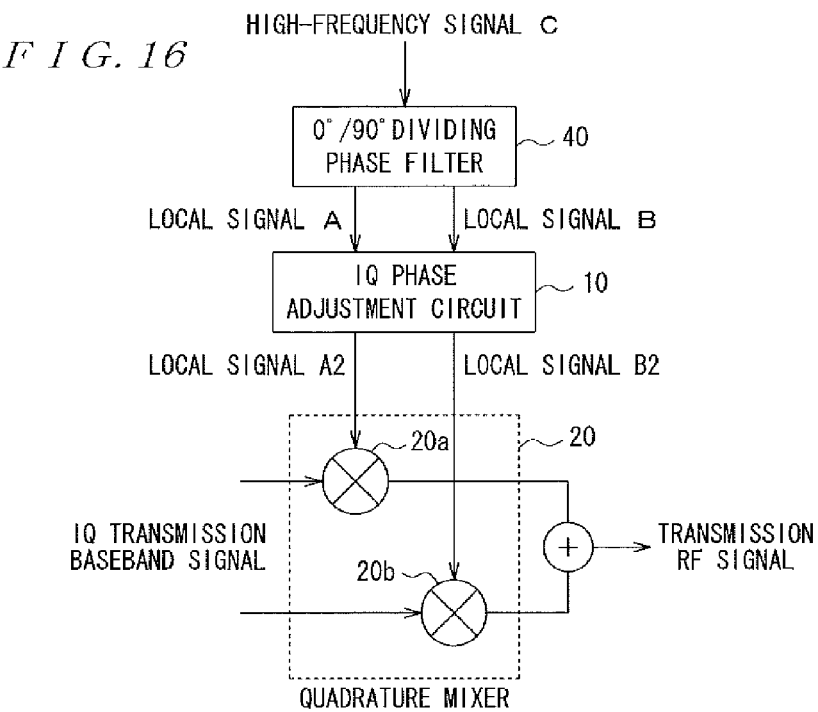
FIG. 16 is a view illustrative of a configuration of an quadrature modulation circuit having the phase adjustment circuit realized by use of a polyphase filter.
Figure 17:
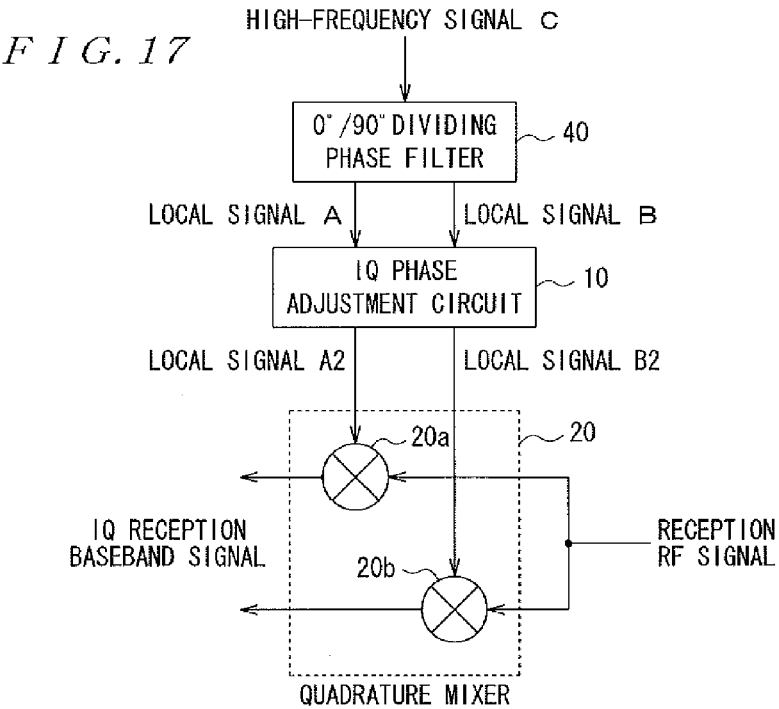
FIG. 17 is a view illustrative of a configuration of an quadrature demodulation circuit having the phase adjustment circuit realized by use of a polyphase filter.
Figure 18:
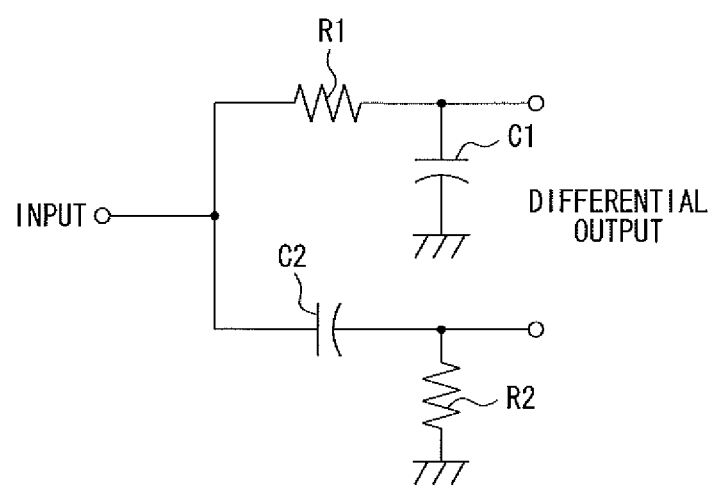
FIG. 18 is a view illustrative of a measure for realizing phase adjustment in Patent Document 1.

In general, in an quadrature modulator and an quadrature demodulator, a signal having a desired local frequency is provided so as to generate the IQ local signals having a phase difference of approximately 90 degrees from each other by use of a polyphase filter (phase dividing unit) for shifting the phase of the signal. FIG. 16 is a view illustrative of a configuration of a quadrature modulation circuit having a polyphase filter. FIG. 17 is a view illustrative of a configuration of a quadrature demodulation circuit having a polyphase filter. In FIG. 16 and FIG. 17, a 0/90-degree dividing polyphase filter 40 receives a high-frequency signal C and outputs the local signals A and B that are IQ local signals having a phase difference of 90 degrees from each other.

In any of the quadrature modulation circuit in FIG. 16 and the quadrature demodulation circuit in FIG. 17, local signals A2 and B2, which are obtained from the IQ phase adjustment circuit 10 that receives the local signals A and B output from the polyphase filter 40, are input into mixers 20a and 20b in the quadrature mixer 20.

In general, in a case where the IQ local signals having a phase difference of 90 degrees from each other are generated by use of a polyphase filter or the like, the phase difference of the IQ local signals deviates from 90 degrees, because variations of accuracy of elements constituting the filter change the time constant from an ideal value. Even in such a case, however, it is made possible to correct the phase difference to have 90 degrees by use of the IQ phase adjustment circuit 10 as illustrated in FIG. 5 and FIG. 6.

Also in this case, it is possible to adjust the phase so that the phase error becomes 0, the phase error resulting from an IQ mismatch caused by a mismatch of the resistance component and the capacitance component in the transmission path from the IQ quadrature local signal generating circuit to the mixer circuit, an IQ mismatch included in the IQ quadrature local signal generating circuit itself, and an IQ mismatch generated by variations of the quadrature mixer.

(Phase Adjustment Method)

According to the phase adjustment circuit as described heretofore, the following phase adjustment method is realized. That is, a first step for receiving one of a first I local signal and a first Q local signal having a frequency identical to that of the first I local signal and a phase different from that of the first I local signal; and a second step for adding or subtracting the other of the first I local signal and the first Q local signal to or from an output signal from the first amplifier, outputting a second Q local signal when said one of the first I local signal and the first Q local signal is the first I local signal, and outputting a second I local signal when said one of the first I local signal and the first Q local signal is the first Q local signal. According to the above method, a precise phase adjustment of the IQ local signals for use in the quadrature modulation/demodulation circuit can be realized.

CONCLUSION

According to the present invention, it is possible to achieve a precise phase adjustment of the IQ local signal for use in the quadrature modulation/demodulation circuit in a wide local frequency range. Additionally, when implementing the IQ phase adjustment circuit in a semiconductor integrated circuit, it is possible to realize the IQ phase adjustment circuit in a very small-sized area.

Furthermore, in a case where the IQ phase adjustment circuit is composed of a frequency divider and a double-frequency signal of a desired local frequency is divided to have a half frequency or a quadruple-frequency signal of a desired local frequency is divided to have a quarter frequency to generate IQ local signal.

INDUSTRIAL AVAILABILITY

The present invention is adaptable to an IQ phase adjustment circuit, for generating an IQ quadrature local signal, for use in a receiving circuit for quadrature demodulation or a transmitting circuit for quadrature modulation.

REFERENCE SIGNS LIST

3: adder
4: subtractor
5: adder and subtractor
10: IQ phase adjustment circuit
11A, 11B: main amplifier
12A, 12B: sub amplifier
20: quadrature mixer
20a, 20b: mixer
30: frequency divider
31-34: differential latch circuit
40: polyphase filter
AMP1, AMP2: variable amplifier
AMP3, AMP4: amplifier
VRI1 variable current source
M12a, M12b transistor
R2a, R2b resistor

The invention claimed is:

1. A phase adjustment circuit comprising:
a first amplifier configured to receive one of a first I local signal and a first Q local signal having a frequency identical to that of the first I local signal and a phase different from that of the first I local signal, the first amplifier having a first gain to provide a desired phase difference between the first I local signal and the first Q local signal;
a first adding and subtracting unit for configured to change between adding and subtracting the other of the first I local signal and the first Q local signal to or from an output signal from the first amplifier, and to output a second Q local signal when said one of the first I local signal and the first Q local signal is the first I local signal, and to output a second I local signal when said one of the first I local signal and the first Q local signal is the first Q local signal;
a second amplifier configured to receive the other of the first I local signal and the first Q local signal, the second amplifier having a second gain to provide the desired phase difference between the first I local signal and the first Q local signal; and
a second adding and subtracting unit configured to change between adding and subtracting said one of the first I local signal and the first Q local signal to or from an output signal from the second amplifier, and to output a second I local signal when said one of the first I local signal and the first Q local signal is the first I local signal, and to output a second Q local signal when said one of the first I local signal and the first Q local signal is the first Q local signal, wherein the second I local signal and the second Q local signal is input to a quadrature mixer.

2. The phase adjustment circuit according to claim 1, wherein a gain of the first amplifier and that of the second amplifier are variable.

3. The phase adjustment circuit according to claim 1, wherein a gain of the first amplifier and that of the second amplifier are fixed.

4. The phase adjustment circuit according to claim 1, wherein the gain of the first amplifier and that of the second amplifier are respectively adjusted by changing a bias current.

5. The phase adjustment circuit according to claim 4, wherein load resistances are connected to the first amplifier and the second amplifier, respectively, and the bias current is respectively supplied to the load resistances.

6. The phase adjustment circuit according to claim 1, wherein the gain of one of the first amplifier and the second amplifier is set to 0 in accordance with a positive or negative value of a phase error that is an error deviating from 90 degrees of a phase difference between the first I local signal and the first Q local signal.

7. A phase adjustment circuit, comprising:
a first amplifier configured to receive one of a first I local signal and a first Q local signal having a frequency identical to that of the first I local signal and a phase different from that of the first I local signal, the first amplifier having a first gain to provide a desired phase difference between the first I local signal and the first Q local signal;
a first adding and subtracting unit configured to add or subtract the other of the first I local signal and the first Q local signal to or from an output signal from the first amplifier, and to output a second Q local signal when said one of the first I local signal and the first Q local signal is the first I local signal, and to output a second I local signal when said one of the first I local signal and the first Q local signal is the first Q local signal;
a second amplifier configured to receive the other of the first I local signal and the first Q local signal, the second amplifier having a second gain to provide the desired phase difference between the first I local signal and the first Q local signal; and
a second adding and subtracting unit configured to add or subtract said one of the first I local signal and the first Q local signal to or from an output signal from the second amplifier, and to output a second I local signal when said one of the first I local signal and the first Q local signal is the first I local signal, and to output a second Q local signal when said one of the first I local signal and the first Q local signal is the first Q local signal,
wherein the second I local signal and the second Q local signal is input to a quadrature mixer, and
wherein one of the first adding and subtracting unit and the second adding and subtracting unit makes an addition, and the other of them makes a subtraction.

8. The phase adjustment circuit according to claim 1, wherein said one of the first I local signal and the first Q local signal is input through a third amplifier into the second adding and subtracting unit, and the other of the first I local signal and the first Q local signal is input through a fourth amplifier into the first adding and subtracting unit.

9. The phase adjustment circuit according to claim 8, wherein the first adding and subtracting unit is realized by wire-connecting an output from the first amplifier and an output from the fourth amplifier, and the second adding and subtracting unit is realized by wire-connecting an output from the second amplifier and an output from the third amplifier.

10. The phase adjustment circuit according to claim 1, further comprising a local signal generating unit for generating the first I local signal and the first Q local signal, wherein the local signal generating unit has a frequency dividing unit for receiving a fifth local signal to divide the fifth local signal at a predefined frequency division ratio and generate the first Q local signal.

11. The phase adjustment circuit according to claim 1, further comprising a local signal generating unit for generating the first I local signal and the first Q local signal, wherein the local signal generating unit has a phase dividing unit for receiving a fifth local signal to shift a phase of the fifth local signal and generate the first Q local signal.

12. A phase modulation method comprising:
- a first step for amplifying one of a first I local signal and a first Q local signal having a frequency identical to that of the first I local signal and a phase different from that of the first I local signal, with a first gain to provide a desired phase difference between the first I local signal and the first Q local signal;
- a second step for changing between adding and subtracting the other of the first I local signal and the first Q local signal to or from an output signal from the first amplifier, outputting a second Q local signal when said one of the first I local signal and the first Q local signal is the first I local signal, and outputting a second I local signal when said one of the first I local signal and the first Q local signal is the first Q local signal;
- a third step for amplifying the other of the first I local signal and the first Q local signal, with a second gain to provide a desired phase difference between the first I local signal and the first Q local signal; and
- a fourth step for changing between adding and subtracting said one of the first I local signal and the first Q local signal to or from an output signal from the second amplifier, outputting a second I local signal when said one of the first I local signal and the first Q local signal is the first I local signal, and outputting a second Q local signal when said one of the first I local signal and the first Q local signal is the first Q local signal, wherein the second I local signal and the second Q local signal is input to a quadrature mixer.

13. A phase modulation method comprising:
- a first step for amplifying one of a first I local signal and a first Q local signal having a frequency identical to that of the first I local signal and a phase different from that of the first I local signal, with a first gain to provide a desired phase difference between the first I local signal and the first Q local signal;
- a second step for adding or subtracting the other of the first I local signal and the first Q local signal to or from an output signal from the first amplifier, outputting a second Q local signal when said one of the first I local signal and the first Q local signal is the first I local signal, and outputting a second I local signal when said one of the first I local signal and the first Q local signal is the first Q local signal;
- a third step for amplifying the other of the first I local signal and the first Q local signal, with a second gain to provide a desired phase difference between the first I local signal and the first Q local signal; and
- a fourth step for adding or subtracting said one of the first I local signal and the first Q local signal to or from an output signal from the second amplifier, outputting a second I local signal when said one of the first I local signal and the first Q local signal is the first I local signal, and outputting a second Q local signal when said one of the first I local signal and the first Q local signal is the first Q local signal, wherein the second I local signal and the second Q local signal is input to a quadrature mixer, and one of the second step and the fourth step makes an addition, and the other of the second step and the fourth step makes a subtraction.

\* \* \* \* \*